(12) United States Patent
Hamm

(10) Patent No.: US 6,520,555 B1
(45) Date of Patent: Feb. 18, 2003

(54) MATERIAL HANDLING MECHANISM

(76) Inventor: Rickey L. Hamm, 5734 Parryville Dr., Houston, TX (US) 77041-6538

( * ) Notice: Subject to any disclaimer, the term of this patent is extended or adjusted under 35 U.S.C. 154(b) by 0 days.

(21) Appl. No.: 10/094,919

(22) Filed: Mar. 12, 2002

(51) Int. Cl.[7] .............................. B65G 7/12; B66F 11/00
(52) U.S. Cl. ............................................. 294/15; 294/26
(58) Field of Search ............................ 294/15, 16, 17, 294/19.1, 22, 26, 27.1, 32, 34, 103.1, 137; 254/131; D8/14

(56) References Cited

U.S. PATENT DOCUMENTS

| 1,321,140 | A | * | 11/1919 | Norris | 294/15 X |
|---|---|---|---|---|---|
| 1,344,932 | A | | 6/1920 | Anderson | |
| 3,203,606 | A | * | 8/1965 | Masterson | 294/15 X |
| 3,414,311 | A | * | 12/1968 | Trimboli | 294/34 |
| D217,002 | S | * | 3/1970 | Wagner | 294/15 X |
| 4,575,142 | A | * | 3/1986 | Parker | 294/15 |
| 4,630,838 | A | | 12/1986 | Stockton | |
| 5,169,190 | A | | 12/1992 | Franklin | |
| 5,511,285 | A | | 4/1996 | Bush et al. | |
| 6,186,566 | B1 | * | 2/2001 | Frederickson | 294/15 |

* cited by examiner

*Primary Examiner*—Johnny D. Cherry
(74) *Attorney, Agent, or Firm*—Donald R. Schoonover

(57) ABSTRACT

A mechanism includes a material-engaging element that is threadably mounted on one end of a threaded body and a handle element on the other end of the threaded body. The material-engaging element is moved on the threaded body as needed to securely, yet comfortably, engage a workpiece.

2 Claims, 2 Drawing Sheets

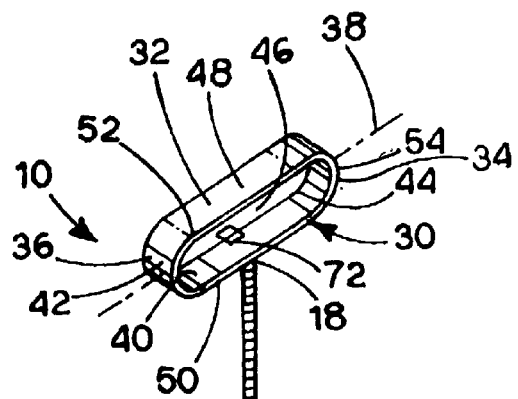
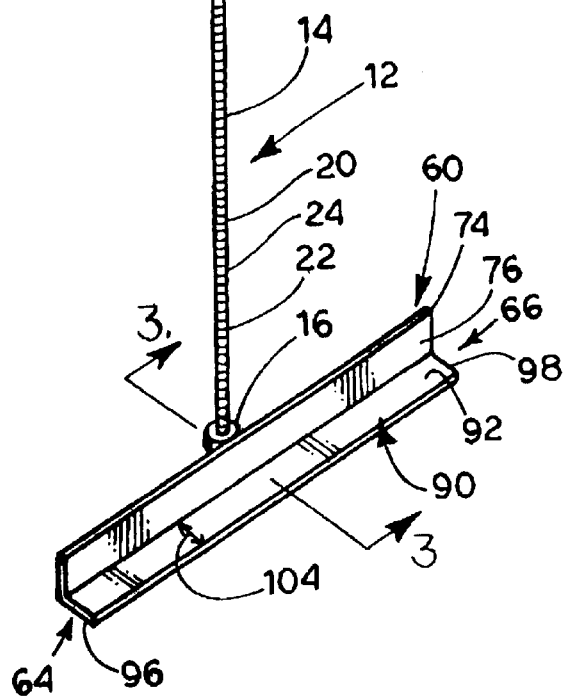
FIG. 1.
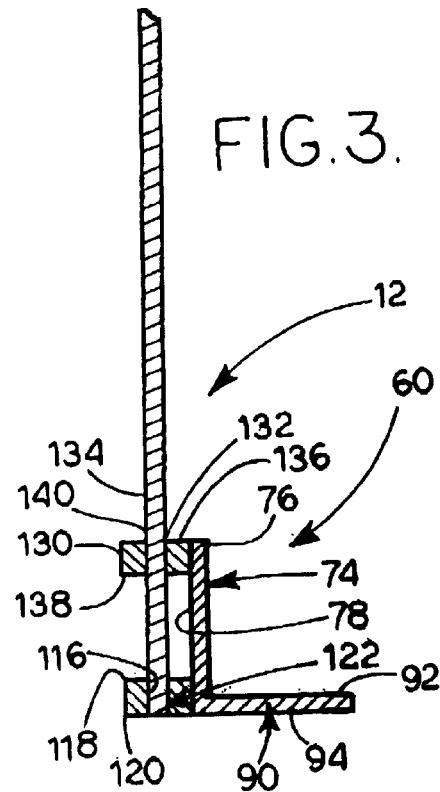
FIG. 3.

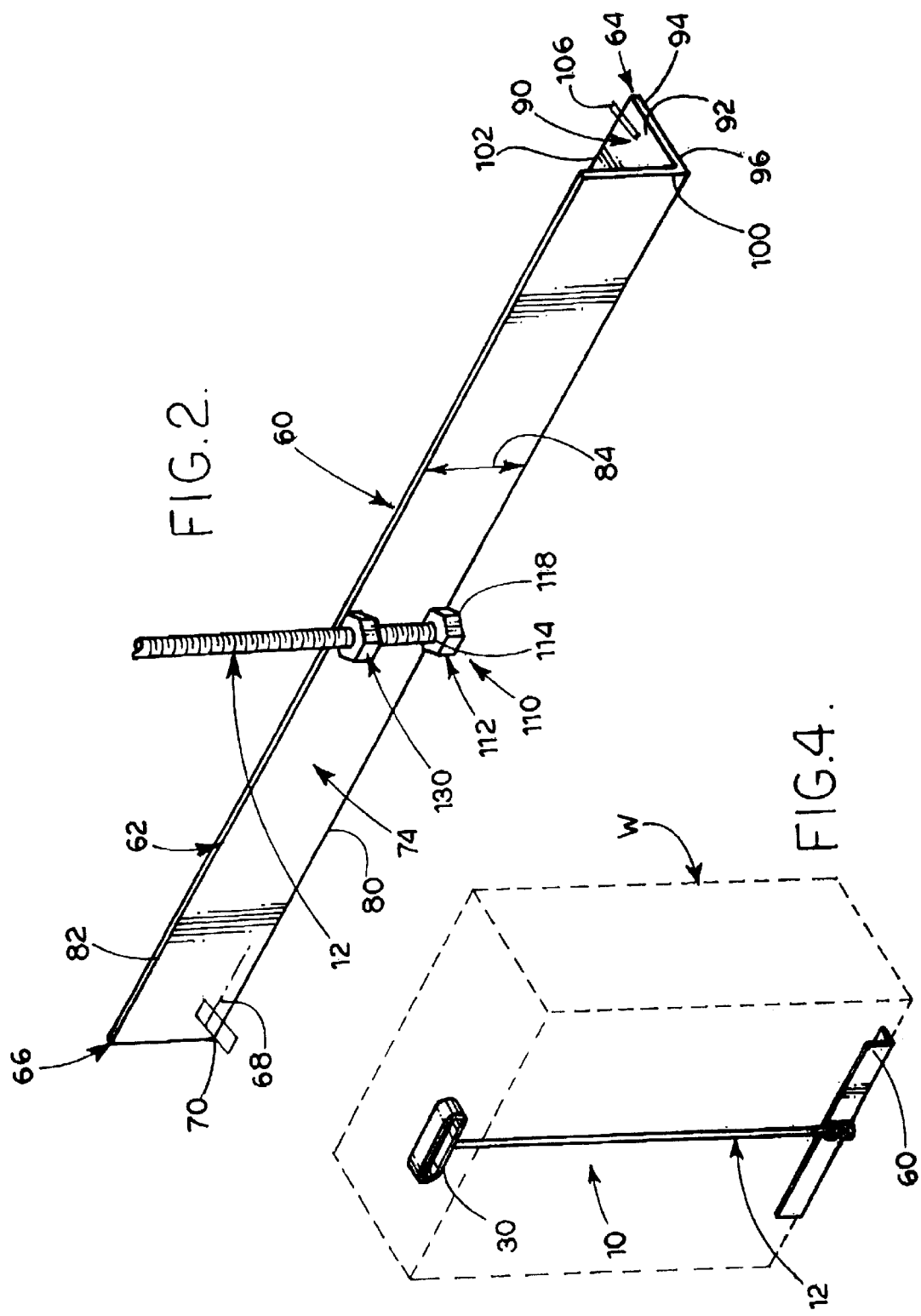

MATERIAL HANDLING MECHANISM

BACKGROUND OF THE INVENTION

1. Field of the Invention

The present invention relates to the general art of material handling, and to the particular field of elements used to handle bulky materials.

2. Discussion of the Related Art

Many situations require a worker to lift and/or move bulky materials, such as sheets of plywood or the like. Often, a second worker is required in order to assist with lifting or moving such materials. This is time consuming and may be wasteful of workers' time.

Therefore, the art has included devices for moving and/or lifting bulky objects. While successful in many situations, these known devices still have several drawbacks. For example, objects may have different sizes and a comfortable, secure grip on one object may not work for a second object. For example, a gripping device that works for one size plywood sheet may not be comfortable for the same worker when moving another, larger, sheet of plywood. While the worker can account for such size variation to some extent, more versatility is required for more efficiency.

Therefore, there is a need for a material handling mechanism that can accommodate a wide range of material sizes.

Still further, some material is most comfortably handled when that material is oriented at an odd angle with respect to the worker carrying the material. That is, many material handling situations are comfortable for the worker when the material is oriented essentially parallel to the direction of movement. However, there may be circumstances when the material must be oriented at a skewed angle with respect to the direction of movement. This is best visualized by envisioning a sheet of plywood being carried by a worker with one face adjacent to the worker's side and the other face presented away from the worker, the top edge of the sheet near the worker's shoulder, the bottom edge of the sheet near the worker's feet, one end edge of the sheet in front of the worker and presented in the direction of movement, and a second end edge located behind the worker. If the faces of the sheet are oriented parallel to the direction of movement, the sheet can be comfortably moved and handled. However, if the faces of the sheet must be oriented at an oblique angle with respect to the direction of movement, handling the sheet may be awkward. Such workpiece handling may require more than one worker, with one worker steadying or guiding the workpiece and the other worker supporting the workpiece. This can be time consuming and wasteful of labor.

Therefore, there is a need for a material handling mechanism that can accommodate a wide range of material handling orientations.

Still further, it may not be easy to gain access to a material supporting surface for some workpieces. An example of this is a process requiring the lifting of certain workpieces where the bottom of the workpiece is not easily accessed. Lifting such workpieces may require two workers, one to lift the workpiece and one to insert a lifting element beneath the workpiece. This can be time consuming and wasteful of labor.

Therefore, there is a need for a workpiece handling mechanism that can be easily maneuvered into a lifting position for a wide variety of workpieces.

PRINCIPAL OBJECTS OF THE INVENTION

It is a main object of the present invention to provide a material handling mechanism that can accommodate a wide range of material sizes.

It is another object of the present invention to provide a material handling mechanism that can accommodate a wide range of material handling orientations.

It is another object of the present invention to provide a workpiece handling mechanism that can be easily maneuvered into a lifting position for a wide variety of workpieces.

SUMMARY OF THE INVENTION

These, and other, objects are achieved by a material-handling mechanism comprising an externally threaded support element having a proximal end and a distal end; a handle element fixedly mounted on the proximal end of said support element; a one-piece L-shaped material-engaging element movably mounted on the distal end of said support element; and two spaced-apart internally threaded nuts mounted on said material-engaging element with the internal thread of each of said nuts threadably engaging the external thread of said support element when said material-engaging element is mounted on said support element.

The lifting mechanism of the present invention thus can be adjusted to accommodate a wide variety of workpiece sizes, orientations and lifting positions. The position and orientation of the material-engaging element relative to the handle can thus be easily adjusted to account for workpiece size, orientation and/or positions. No assistance is required to account for materials having a wide range of sizes, orientations and/or positions whereby a single worker can lift and/or move a large variety of workpieces and/or workpiece orientations and/or positions.

BRIEF DESCRIPTION OF THE DRAWINGS

FIG. 1 is a perspective view of a material-handling mechanism embodying the present invention.

FIG. 2 is a perspective view of a material-engaging element of the material-handling mechanism of the present invention.

FIG. 3 is side view of a portion of the material-handling mechanism of the present invention as seen along line 3—3 of FIG. 1.

FIG. 4 is a perspective view of the material-handling mechanism of the present invention in a lifting position with respect to a workpiece.

DETAILED DESCRIPTION OF THE INVENTION

Other objects, features and advantages of the invention will become apparent from a consideration of the following detailed description and the accompanying drawings.

The lifting mechanism of the present invention includes a handle on one end of a threaded support element and a material-engaging element on another end of the support element when the mechanism is in the set-up configuration. The material-engaging element can be moved toward and away from the handle and can be oriented in a variety of positions relative to the handle to account for various workpiece sizes, orientations and positions. The workpiece-engaging element can even be totally removed from the support element for storage and transportation of the lifting mechanism if desired.

Referring to FIGS. 1–3, it can be understood that the present invention is embodied in a material-handling mechanism 10 comprising a support element 12 which has an elongate body 14 having a distal end 16, a proximal end 18 and a longitudinal axis 20 which extends between distal end 16 and proximal end 18. Body 14 has an outer surface 22 and an external screw thread 24 is defined on outer surface 22 of body 14 from distal end 16 of body 14 to proximal end 18 of body 14.

Material-handling mechanism 10 further includes a handle element 30 fixedly mounted on proximal end 18 of body 14 of support element 12. Handle element 30 includes a body 32 which is in the shape of a prolate oval and which is cylindrical. Body 32 includes a first end 34, a second end 36, and a longitudinal axis 38 extending between the first and second ends of body 32 of handle element 30. Longitudinal axis 38 of cylindrical body 32 extends perpendicular to longitudinal axis 20 of body 14 of support element 12. Body 32 of handle element 30 further includes an inside surface 40 and an outside surface 42. Since body 32 is in the shape of a prolate oval, it has a major axis 44 and a minor axis 46 with two linear portions 48 and 50 each extending along the major axis between two arcuate end portions 52 and 54. Minor axis 46 of body 32 extends in the direction of, and is aligned with, longitudinal axis 20 of support element 12.

Material-handling mechanism 10 further includes a one-piece material-engaging element 60 mounted on distal end 16 of body 14 of support element 12 in a set-up configuration HIS such as shown in FIGS. 1–3. Material-engaging element 60 includes an elongate L-shaped body 62, a first end 64, a second end 66. A longitudinal axis 68 extends between the first and second ends 64, 66 of L-shaped body 62 of material-engaging element 60. Longitudinal axis 68 of material-engaging element 60 extends in a plane 70 which is parallel to a plane 72 containing major axis 44 of body 32 of handle element 30.

Material-engaging element 60 further includes a back element 74 which has an inner surface 76, and an outer surface 78. Outer surface 78 of back element 74 of material-engaging element 60 is movably attached to body 14 of support element 12 when the material-handling mechanism 10 is in the set-up configuration shown in the figures.

Back element 74 includes a first edge 80 extending from first end 64 of material-engaging element 60 to second end 66 of material-engaging element 60 in the direction of longitudinal axis 68 of the material-engaging element 60, and a second edge, 82 extending from first end 64 toward second end 66 in the direction of longitudinal axis 68. First edge 80 of back element 74 is spaced from second edge 82 and a width dimension 84 is defined for the back element 74 extending between the first and second edges 80, 82 of back element 74.

Material-engaging element 60 further includes a base element 90 which has an inner surface 92 located adjacent to inner surface 76 of back element 74, an outer surface 94, a first end 96 located adjacent to first end 64 of material-handling element 60, a second end 98 located adjacent to second end 66 of material-handling element 60, a first edge 100 coincident with first edge 80 of back element 74 extending from first end 64 of material-engaging element 60 to second end 66 of material-engaging element 60. Base element 90 further includes a second edge 102 spaced apart from first edge 100 of base element 90 and extending from first end 64 to second end 66. Base element 90 has a width dimension 104 extending between the first and second edges 100, 102 thereof. Width dimension 104 of base element 90 is contained in a plane 106 that is parallel to plane 72 containing the major axis 44 of the handle element 30.

Material-handling mechanism 10 further comprises a connecting unit 110 on outer surface 78 of back element 74 of material-engaging element 60. Connecting unit 110 includes a first nut 112. First nut 112 includes a bore 114 defined therethrough, an internal thread 116 defined on first nut 112 adjacent to bore 114, a first face 118, a second face 120, and a central axis 122 extending between the first and second faces 118, 120 of first nut 112. First nut 112 is mounted on outer surface 78 of back element 74 of material-engaging.element 60 adjacent to first edge 80 of back element 74 and is located midway between the first and second ends 64, 66 of material engaging element 60.

Connecting unit 110 further includes a second nut 130 which has a bore 132 defined therethrough, an internal thread 134 defined on second nut 130 adjacent to bore 132 defined through second nut 130. Second nut 130 further includes a first face 136, a second face 138, and a central axis 140 which extends between the first and second faces 136, 138 of second nut 130 of connecting unit 110.

As shown in FIGS. 2 and 3, second nut 130 of connecting unit 110 is mounted on outer surface 78 of back element 74 adjacent to second edge 82 of back element 74 and is positioned midway between the first and second ends 64, 66 of material-engaging element 60. As can be seen in FIGS. 2 and 3, central axis 122 of first nut 112 is aligned with and co-linear with central axis 140 of second nut 130 of connecting unit 110. The first and second nuts 112, 130 of connecting element 110 are spaced apart from each other along width dimension 84 of back element 74. The internal threads of the first and second nuts 112, 130 threadably engage external thread 24 of body 14 of support element 12 when material-engaging element 60 is mounted on support element 12 in the set-up configuration.

As shown in FIG. 4, material-handling mechanism 10 can be used to lift a workpiece W by positioning material-engaging element 60 beneath the workpiece and adjusting the position of the material engaging-element relative to handle element 30 by rotating body 14 with respect to the nuts to draw the material engaging element toward the handle element 30 (or vice versa as needed) via the threaded connection between thread 24 on body 14 and threads 116 and 134 in the first and second nuts 112, 130 respectively, then lifting the mechanism by the handle element 30. If the workpiece is in an odd orientation, the workpiece-engaging element can be oriented at a corresponding skewed angle with respect to the handle element 30 so a worker can obtain a secure grip on the mechanism for lifting and moving the workpiece. As will be understood by those skilled in the art based on the teaching of this disclosure, workpiece W can be any item, such as a large sheet of plywood or the like in addition to the object shown in FIG. 4 without departing from the scope of the present disclosure.

It is understood that while certain forms of the present invention have been illustrated and described herein, it is not to be limited to the specific forms or arrangements of parts described and shown.

I claim:

1. A material-handling mechanism comprising:
    a) a support element having
       (1) an elongate body
          (A) having a distal end,
          (B) a proximal end, and
          (C) a longitudinal axis extending between the distal end and the proximal end,
       (2) an outer surface, and
       (3) an external screw thread defined on the outer surface of said body from the distal end of the body to the proximal end of the body;

b) a handle element fixedly mounted on the proximal end of the body of said support element and including
  (1) a prolate oval-shaped cylindrical body having
    (A) a first end,
    (B) a second end,
    (C) a longitudinal axis extending between the first and second ends of the cylindrical body of said handle element,
    (D) the longitudinal axis of the cylindrical body of said handle element extending perpendicular to the longitudinal axis of the body of said support element,
    (E) an inside surface,
    (F) an outside surface,
    (G) a major axis having two ends,
    (H) a minor axis,
    (I) two arcuate end portions, one end portion being on each end of the major axis,
    (J) two linear portions each extending along the major axis of the body of said handle element between the two arcuate end portions of the body of said handle element, and
    (K) the minor axis of the body of said support element extending in the direction of and being aligned with the longitudinal axis of said support element;
c) a one-piece material-engaging element mounted on the distal end of the body of said support element in a set-up configuration and including
  (1) an elongate L-shaped body,
  (2) a first end,
  (3) a second end,
  (4) a longitudinal axis extending between the first and second ends of the L-shaped body of said material-engaging element,
  (5) the longitudinal axis of said material-engaging element extending in a plane which is parallel to a plane containing the major axis of the body of said handle element,
  (6) a back element having
    (A) an inner surface,
    (B) an outer surface,
    (C) the outer surface of the back element of said material-engaging element being movably attached to the body of said support element,
    (D) a first edge extending from the first end of said material-engaging element to the second end of said material-engaging element in the direction of the longitudinal axis of said material-engaging element,
    (E) a second edge extending from the first end of said material-engaging element to the second end of said material-engaging element in the direction of the longitudinal axis of said material-engaging element,
    (F) the first edge of the back element of said material-engaging element being spaced from the second edge of the back element of said material-engaging element, and
    (G) a width dimension extending between the first and second edges of the back element of said material-engaging element,
  (7) a base element having
    (A) an inner surface located adjacent to the inner surface of the back element of said material-engaging element,
    (B) an outer surface,
    (C) a first end located adjacent to the first end of said material-handling element,
    (D) a second end located adjacent to the second end of said material-handling element,
    (E) a first edge coincident with the first edge of the back element of said material-engaging element and extending from the first end of said material-engaging element to the second end of said material-engaging element,
    (F) a second edge spaced apart from the first edge of the base element of said material-engaging element and extending from the first end of said material-engaging element to the second end of said material-engaging element,
    (G) a width dimension extending between the first and second edges of the base element of said material-engaging element, and
    (H) the width dimension of the base element of said material-engaging element being contained in a plane that is parallel to the plane containing the major axis of the body of said handle element; and
d) a connecting unit on the outer surface of the back element of said material-engaging element and including
  (1) a first nut having
    (A) a bore defined therethrough,
    (B) an internal thread defined on the first nut adjacent to the bore defined through the first nut,
    (C) a first face,
    (D) a second face, and
    (E) a central axis extending between the first and second faces of the first nut of said connecting unit,
  (2) the first nut of said connecting unit being mounted on the outer surface of the back element of said material-engaging element adjacent to the first edge of the back element of said material-engaging element and being located midway between the first and second ends of said material-engaging element,
  (3) a second nut having
    (A) a bore defined therethrough
    (B) an internal thread defined on the second nut adjacent to the bore defined through the second nut,
    (C) a first face,
    (D) a second face, and
    (E) a central axis extending between the first and second faces of the second nut of said connecting unit,
  (4) the second nut of said connecting unit being mounted on the outer surface of the back element of said material-engaging element adjacent to the second edge of the back element of said material-engaging element and being located midway between the first and second ends of said material-engaging element,
  (5) the central axis of the first nut of said connecting element being aligned with and co-linear with the central axis of the second nut of said connecting unit,
  (6) the first and second nuts of said connecting element being spaced apart from each other along the width dimension of the back element of said material-engaging element, and
  (7) the internal threads of the first and second nuts of said connecting unit threadably engaging the external thread on the body of said support element when said material-engaging element is mounted on said support element in the set-up configuration.

2. A material-handling mechanism comprising:
a) an externally threaded support element having a proximal end and a distal end;
b) a handle element fixedly mounted on the proximal end of said support element;
c) a one-piece L-shaped material-engaging element movably mounted on the distal end of said support element; and
d) two spaced-apart internally threaded nuts mounted on said material-engaging element with the internal thread of each of said nuts threadably engaging the external thread of said support element when said material-engaging element is mounted on said support element.

* * * * *